United States Patent [19]

Nakamura et al.

[11] Patent Number: 4,980,218
[45] Date of Patent: Dec. 25, 1990

[54] WEATHER STRIP

[75] Inventors: Shigeru Nakamura, Odawara; Hiroshi Sugawara, Yokohama, both of Japan

[73] Assignee: Nissan Motor Co., Ltd., Yokohama, Japan

[21] Appl. No.: 377,939

[22] Filed: Jul. 11, 1989

[30] Foreign Application Priority Data

Jul. 12, 1988 [JP] Japan .................. 63-173272

[51] Int. Cl.$^5$ ............................................. E06B 7/16
[52] U.S. Cl. ..................................... 428/122; 49/490; 52/399; 296/93; 428/358
[58] Field of Search .................. 428/122, 358; 49/490; 52/399; 296/93

[56] References Cited

U.S. PATENT DOCUMENTS 4,308,302 12/1981 Etter et al. .............. 428/122 X

FOREIGN PATENT DOCUMENTS 61-238507 10/1986 Japan .................. 428/122

OTHER PUBLICATIONS

Petraru et al., Chemical Abstracts, vol. 105, p. 57, No. 154325h (1986).

Del Gatto, ed., Materials and Compounding Ingredients for Rubber pp. 161 and 167 (1970).

Primary Examiner—Henry F. Epstein
Attorney, Agent, or Firm—Foley & Lardner, Schwartz, Jeffery, Schwaab, Mack, Blumenthal & Evans

[57] ABSTRACT

Herein disclosed is a weather strip constructed of a rubber composition. The rubber composition comprises a mixture of 70 to 50 parts by weight of acrylonitrile-butadiene rubber and 30 to 50 parts by weight of polyvinylchloride, the acrylonitrile-butadiene rubber including not greater than 28 percent by weight of acrylonitrile; 10 to 40 parts by weight of dioctyl adipate relative to 100 parts by weight of the mixture; and not less than 0.1 part by weight of glycerin fatty acid ester, the glycerin fatty acid ester having a melting point not less than 45° C. and having a rational formula represented by:

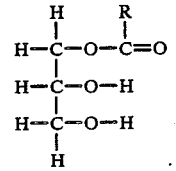

4 Claims, 1 Drawing Sheet

← REAR    FRONT →

← FRONT    REAR →

WEATHER STRIP

BACKGROUND OF THE INVENTION

1. Field of the Invention

The present invention relates in general to a weather strip for automobiles, and more particularly, to a material of the weather strip, which eliminates or at least minimizes the uncomfortable squeak produced when the weather strip rubs against a glass pane, such as a door glass or the like.

2. Description of the Prior Art

In order to clarify the task of the present invention, one conventional weather strip used in an automobile will be outlined with reference to FIGS. 2 and 3 of the accompanying drawings.

In the drawings, particularly FIG. 3, there is partially shown a motor vehicle of the so-called "pillerless hard-top sedan type", to which the conventional weather strip is applied. Denoted by numeral 1 is the weather strip which is interposed between a front door glass 2 and a rear door glass 3. As is seen from FIG. 2, the weather strip 1 comprises a gripping portion 1a having a generally U-shaped cross section, a supporting wall portion 1b extending obliquely inward from an inboard side of the gripping portion 1a and a lip portion 1c extending outward from the leading end of the supporting wall portion 1b. The gripping portion 1a grips a front edge of the rear door glass 3. The lip portion 1c is contactable with the front door glass 2 to achieve a watertight sealing therebetween.

Hitherto, as the material of such weather strip 1, ethylene-propylene-diene-methylene (EPDM) has been widely used for its tolerable antiweatherability and reduced cost.

However, the weather strip made of such EPDM, particularly when used, for long periods tends to produce an uncomfortable squeak when the door glass 2 rubs against the weather strip 1, more particularly, against the lip portion 1c of the same or vice versa.

In order to solve this drawback, several measures have been hitherto proposed and put into practical use. One of the measures is to apply the weather strip with a surface treating agent to reduce the skin friction of the weather strip. Furthermore, Japanese Patent First Provisional Publication No. 61-238507 shows a measure of using acrylonitrile-butadiene rubber (NBR)/polyvinylchloride (PVC) as the material of the weather strip for reducing the friction.

However in the former measure, the durability of the surface treating agent is inevitably poor because the agent tends to peel off due to repeated opening and closing movement of the door glass 2. Furthermore, the latter measure has failed to produce a satisfied result in minimizing the squeak.

SUMMARY OF THE INVENTION

It is therefore an object of the present invention to provide a weather strip which is free of the undesirable squeak.

According to the present invention, there is provided a weather strip constructed of a rubber composition which comprises a mixture of 70 to 50 parts by weight of acrylonitrile-butadiene rubber and 30 to 50 parts by weight of polyvinylchloride, the acrylonitrilebutadiene rubber including not greater than 28 percent by weight of acrylonitrile; 10 to 40 parts by weight of dioctyl adipate relative to 100 parts by weight of the mixture; and not less than 0.1 part by weight of glycerin fatty acid ester, the glycerin fatty acid ester having a melting point not less than 45° C. and having a rational formula represented by:

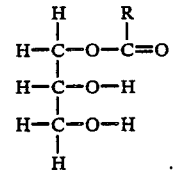

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
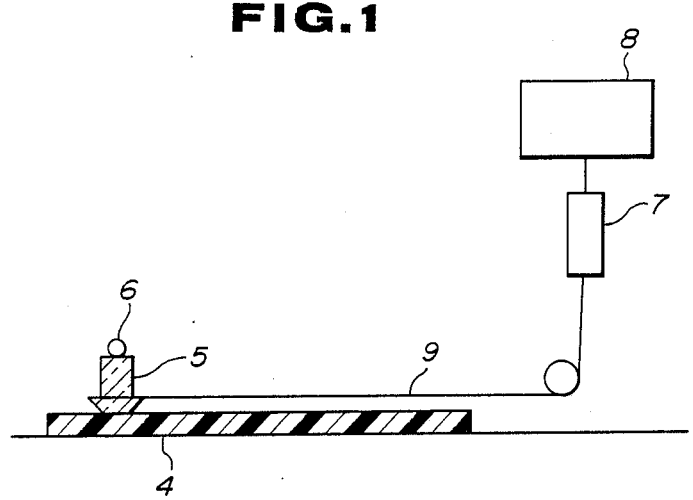
FIG. 1 is a schematically illustrated measuring device for measuring the coefficient of static friction of test samples.

In the following, the weather strip according to the present invention will be described in detail.

The present invention is based on the fact that the undesirable squeak produced by the weather strip depends on the degree of the coefficient of static friction between the glass and the weather strip.

As is known to those skilled in the art, there is an assured correlation between a coefficient of static friction and a so-called adhesion. That is, if the rubber substance has on its surface solid materials bled out therefrom, the coefficient of static friction is reduced.

Furthermore, it is known that there are bled-out solid materials of a type which can reduce the coefficient of static friction to a sufficiently low level even though the amount of the bled-out materials is relatively small. Furthermore, it is also known that liquid beldout materials increase the coefficient of static friction.

Taking the above-mentioned facts into consideration, various examinations and tests were carried out which revealed important facts which will be described in the following.

That is, it was discovered that a weather strip will exhibit a satisfied squeakless operation if the same is constructed of a rubber composition which comprises a mixture of 70 to 50 parts by weight of acrylonitrile-butadiene rubber and 30 to 50 parts by weight of polyvinylchloride, the acrylonitrile-butadiene rubber including not greater than 28 percent by weight of acrylonitrile; 10 to 40 parts by weight of dioctyl adipate relative to 100 parts by weight of the mixture; and not less than 0.1 part by weight of glycerin fatty acid ester, the glycerin fatty acid ester having a melting point not less than 45° C. and having a rational formula represented by:

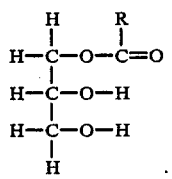

Even when paraffin wax and higher alcohol were used as a substitute for the glycerin fatty acid ester, a satisfactorily small coefficient of static friction was not obtained. When the amount of glycerin fatty acid ester was less than 0.1 part by weight, the coefficient became too great. When glycerin fatty acid ester having a melting point lower than 45° C. was used, the material bled-out thereof showed a liquid condition. When a plasticizer other than the dioctyl adipate was used, long use of the rubber substance (viz., weather strip) increased the bled-out of the plasticizer and thus increased the coefficient of static friction. Furthermore, when the amount of the plasticizer was less than 10 parts by weight with respect to the polymer of 100 parts by weight, hardness adjustment of the produced rubber substance became difficult making the kneading (or blending) of the rubber composition impossible. Furthermore, when the amount of the plasticizer was greater than 40 parts by weight, liquid bled-out was increased causing an increase in the coefficient of static friction of the product. The reason of using a mixture of acrylonitrile-butadiene rubber (NBR) and polyvinylchloride (PVC) as the base was that they have small coefficients of static frictions. However, when the mixing ratio of NBR and PVC was higher than 70/30, the antiweatherability of the product became poor. Furthermore, when the mixing ratio of NBR and PVC was less than 50/50, the permanent set in fatigue of the product was increased to an unpractical degree.

When the amount of nitrite in the acrylonitrile-butadiene rubber (NBR) was greater than 28% by weight, the bled-out phenomenon was remarked and thus the coefficient of static friction of the product was increased.

In order to determine the above-mentioned facts, the following examinations were carried out on both the invention and prior art.

EMBODIMENTS

Test samples according to the present invention were constructed of a rubber composition having the following ingredients.

Polymer (NBR/PVC) 100 parts by weight (mixing ratio varied)
Carbon black (N550) 70 parts by weight
Plasticizer kinds varied, amounts varied
Zinc oxide 5 parts by weight
Stearic acid 1 part by weight
Vulcanization accelerator 3 parts by weight
Sulfur 1 part by weight
Lubricant kinds varied, amounts varied It is to be noted that the rubber composition was well kneaded and then pressed and heated at 160° C. for 15 minutes to mold each test sample.

REFERENCES

Test samples according to the prior art were constructed of a rubber composition having the following ingredients.

Polymer (EPDM) 100 parts by weight
Carbon black (N550,) 70 parts by weight
Paraffin oil 30 parts by weight
Zinc oxide 5 parts by weight
Stearic acid 1 part by weight
Vulcanization accelerator 3 parts by weight
Sulfur 1 part by weight It is also to be noted that the rubber composition was well kneaded and then pressed and heated at 160° C. for 15 minutes to mold each test sample.

These test samples of the invention and the prior art were subjected to a friction test using such a measuring device as shown in FIG. 1. In the drawing, denoted by numeral 4 is the test sample whose coefficient of static friction is to be measured. The measuring device generally comprises a mushroom-shaped glass-made slider 5 (25 mm in diameter, 40 mm in length) which is slidably put on the test sample 4, a weight 6 of 200g which is put on the slider 5, a string 9 which pulls the glass-made slider 5 in a horizontal direction, a load cell 7 which detects a load applied to the string 9 and a FFT (Fast Fourier transform) analyzer 8 which derives the coefficient of static friction from the load detected by the load cell 7.

The test samples undergoing the friction test were all subjected to a 1000-times rubbing test under the same condition and then they were subjected to the friction test again.

Figure 2:
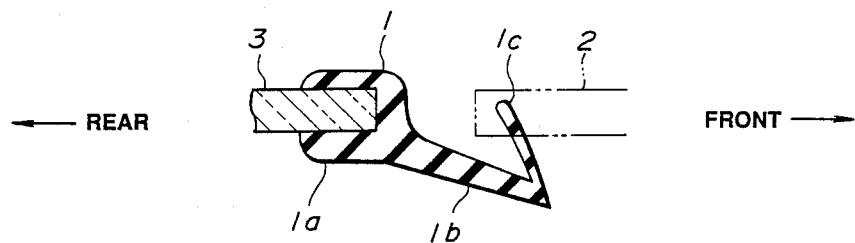
FIG. 2 is a horizontally sectional view of a conventional weather strip used in an automobile of socalled "pillerless hardtop sedan type"
Figure 3:
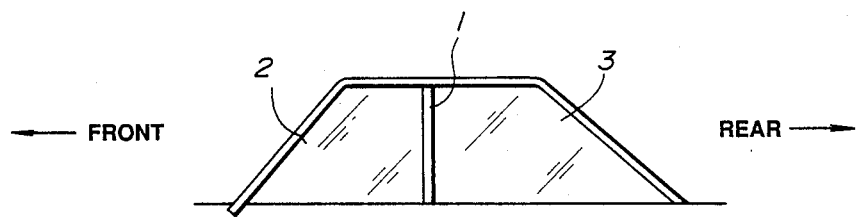
FIG. 3 is a side, but partial, view of the pillerless hardtop sedan shown in FIG. 2.

Weather strips were also produced from the same rubber compositions of the invention and the prior art, and they were subjected to a road test wherein the weather strips were mounted on an automotive door glass in a manner as is shown in FIGS. 2 and 3. In the road test, it was examined whether, after a long drive on a rough road, the uncomfortable squeak was produced or not from the weather strip.

The rubber compositions of the invention and the test results of the same are shown in TABLE-1 and those of the prior art are shown in TABLE-2.

As is seen from these tables, the test samples and the molded weather strips according to the present invention show improved results as compared with those of the prior art. In fact, the undesirable squeak was not produced by the weather strips of the invention.

In practical use, only the lip portion 1c of the weather strip may be constructed of the rubber composition according to the invention.

TABLE 1

| | (INVENTION) | | | | |
|---|---|---|---|---|---|
| | Embodiment 1 | Embodiment 2 | Embodiment 3 | Embodiment 4 | Embodiment 5 |
| Polymer (parts by weight) | NBR/PVC (70/30) | ← | ← | NBR/PVC (60/40) | NBR/PVC (50/50) |
| Acrylonitrile in NBR (percent by weight) | 28 | ← | ← | 24 | 28 |
| Plasticizer (parts by weight) | DOA(30) | ← | ← | DOA(30) | DOA(30) |

TABLE 1-continued

|  | (INVENTION) | | | | |
|---|---|---|---|---|---|
|  | Embodiment 1 | Embodiment 2 | Embodiment 3 | Embodiment 4 | Embodiment 5 |
| Solvent (Parts by weight) | Glycerin fatty acid ester (0.5) | Glycerin fatty acid ester (0.1) | Glycerin fatty acid ester (1.0) | Glycerin fatty acid ester (0.5) | Glycerin fatty acid ester (0.5) |
| Surface treating agent | None | None | None | None | None |
| Coefficient of static friction | 1.4 | 2.2 | 0.9 | 1.3 | 1.4 |
| Coefficient of static friction after 1000 times rubbing test | 1.4 | 2.3 | 0.9 | 1.3 | 1.5 |
| Squeak Evaluation on Road Test | ○ | ○ | ◎ | ○ | ○ |

*Glycerin fatty acid ester: "Excel 84" (trade name) produced by "KAO" Co., Ltd.
Squeak Evaluation:
◎ None
○ Almost none
Δ Faintly heard
x Poor
xx Very Poor

TABLE 2

|  | (PRIOR ART) | | | | | | |
|---|---|---|---|---|---|---|---|
|  | Reference 1 | Reference 2 | Reference 3 | Reference 4 | Reference 5 | Reference 6 | Reference 7 |
| Polymer (parts by weight) | EPDM (—) | EPDM (—) | NBR/PVC (70/30) | NBR/PVC (70/30) | NBR/PVC (70/30) | ← | NBR/PVC (70/30) |
| Acrylonitrile in NBR (percent by weight) | — | — | 28 | 28 | 28 | | 38 |
| Plasticizer (parts by weight) | — | — | DOP(30) | DOP(30) | DOA(30) | ← | DOA(30) |
| Solvent (Parts by weight) | — | — | None | Paraffin wax (0.5) | None | Paraffin wax (0.5) | None |
| Surface treating agent | None | Yes | — | — | — | — | — |
| Coefficient of static friction | 5.0 | 1.5 | 4.3 | 3.6 | 3.0 | 2.6 | 3.4 |
| Coefficient of static friction after 1000 times rubbing test | 5.2 | 5.0 | 4.5 | 4.0 | 3.2 | 2.8 | 3.4 |
| Squeak Evaluation on Road test | xx | x | x | x | Δ | Δ | x |

*DOP: dioctyl phthalate
DOA: dioctyl adipate
Squeak Evaluation:
◎ None
○ Almost none
Δ Faintly heard
x Poor
xx Very Poor

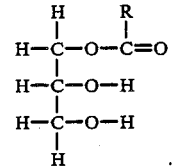

What is claimed is:

1. A weather strip constructed of a rubber composition which comprises:
   a mixture of 70 to 50 parts by weight of acrylonitrile-butadiene rubber and 30 to 50 parts by weight of polyvinylchloride, said acrylonitrile-butadiene rubber including not greater than 28 percent by weight of acrylonitrile;
   10 to 40 parts by weight of dioctyl adipate relative to 100 parts by weight of said mixture; and
   not less than 0.1 part by weight of glycerin fatty acid ester, said glycerin fatty acid ester having a melting point not less than 45° C. and having a rational formula represented by:

2. A weather strip as claimed in claim 1, in which said rubber composition is well kneaded and then pressed heated at 160° C 15 minutes to produce a molded product.

3. A weather strip as claimed in claim 1, further comprising:
   70 parts by weight of carbon black;
   5 parts by weight of zinc oxide;
   1 part by weight of stearic acid;
   3 parts by weight of vulcanization accelerator; and
   1 part by weight of sulfur.

4. A weather strip as claimed in claim 3, in which said weather strip has a configuration which comprises:
   a gripping portion having a generally U-shaped cross section, said gripping portion being adapted to mounted to an edge of a glass pane;
   a supporting wall portion extending in one direction from said gripping portion; and
   a lip portion extending in the other direction from a leading end of said supporting wall.

* * * * *